C. H. WILSON.
COUPLING FOR REINFORCED CONCRETE PIPES.
APPLICATION FILED DEC. 14, 1910.

1,003,309.

Patented Sept. 12, 1911.

WITNESSES
Geo. Bambay
W. S. Orton

INVENTOR
Charles H. Wilson

BY Munn & Co.

ATTORNEYS

UNITED STATES PATENT OFFICE.

CHARLES HARRISON WILSON, OF RED OAK, IOWA.

COUPLING FOR REINFORCED-CONCRETE PIPES.

1,003,309.

Specification of Letters Patent. Patented Sept. 12, 1911.

Application filed December 14, 1910. Serial No. 597,329.

*To all whom it may concern:*

Be it known that I, CHARLES H. WILSON, a citizen of the United States, and a resident of Red Oak, in the county of Montgomery and State of Iowa, have invented a new and Improved Coupling for Reinforced-Concrete Pipes, of which the following is a full, clear, and exact description.

My invention relates to a coupling means for uniting the reinforcements in adjacent concrete reinforced pipes.

An object of my invention is to provide a new and improved means for uniting two pipe sections together in such a manner that there will be a positive and tight joint between the different sections, and it has for a further object the disposition of this coupling means so that they are not exposed to the weather and are thereby protected from any rusting action. I attain these objects by bending the ends of the longitudinal reinforcements into hooks and fastening the reinforcement of adjacent pipes by a U-shaped coupling means and pin connections.

With the above and other objects in view, as will more fully hereinafter appear, the present invention consists in certain novel details of construction and arrangement of parts hereinafter fully described, illustrated in the accompanying drawings and more particularly pointed out in the appended claims.

Figure 1:
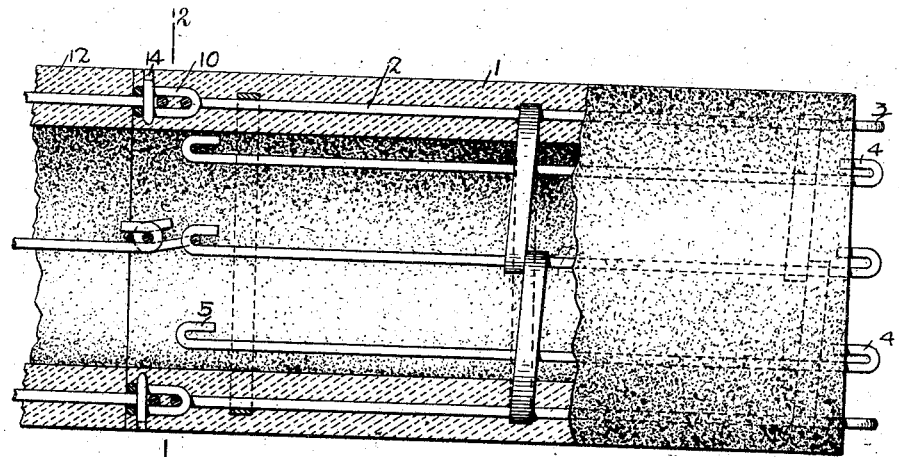
Figure 2:
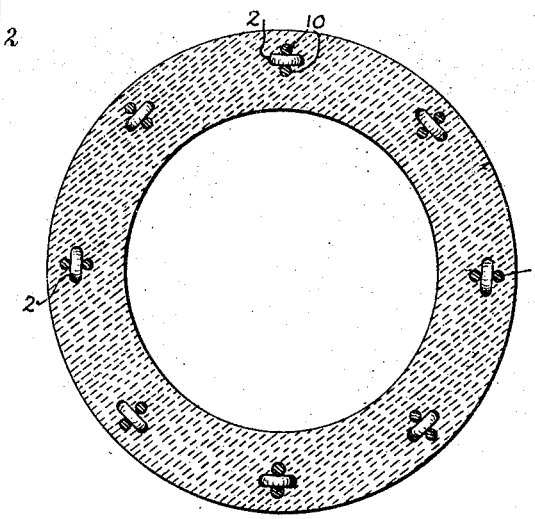
Figure 3:
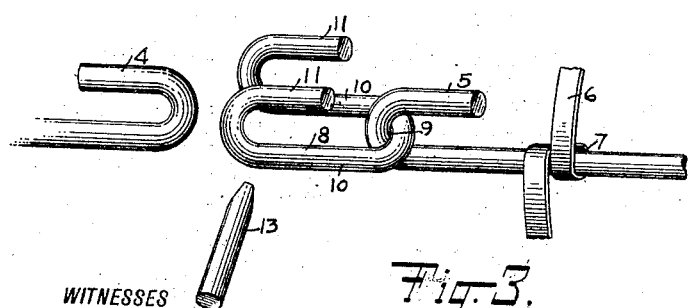

In the accompanying drawings forming part of this specification, the reference characters of which indicate corresponding parts in the several figures, Figure 1 is an elevation of a preferred embodiment of my invention, partly broken away to show my improved reinforcements; Fig. 2 is a transverse sectional view, taken on the line 2—2 of Fig. 1, and Fig. 3 is a detail perspective view, showing the reinforcement at the end of two adjacent pipes, together with the coupling means.

The pipe section 1 has extending longitudinally therein and between the inner and outer faces a series of spaced-apart, longitudinal reinforcing rods 2, extending beyond one end of the pipe, as shown at 3, and bent back upon itself to form hooks 4. The opposite ends of these reinforcing rods are bent into hooks 5 a short distance in from the opposite end of the pipe 1. Extending between the hooks 5 on the ends of the reinforcing rods 2 and the adjacent open end of the pipe is a series of radially-disposed recesses, adapted to receive the coupling means hereinafter described.

The several longitudinal reinforcing rods 2 are connected by means of circumferentially disposed, spaced apart bands 6, the free ends 7 of which are fastened to one of the longitudinal reinforcing rods 2. Engaging each of the hooks 5 of the longitudinal reinforcing rods 2 are U-shaped coupling members 8, the crotches 9 of which engage the hooks 5. The free ends of these U-shaped coupling means are bent back upon themselves at right angles to the plane of the side members 10, in order to form parallel hook members 11. The projecting hooks 4 of the next succeeding pipe section 12 are inserted into the recesses at the adjacent end of the pipe section 1, and a key or pin 13 is inserted between the crotches of the hooks 4 and the crotches formed by the two bent-over members 11, thereby firmly locking the pipe sections 1 and 12 together. These pins 13 are inserted through apertures 14 in the side of the pipe 1, which recesses may afterward be filled up with the material of which the pipes are constructed, thereby covering up the coupling means, protecting it from the weather and forming a firm, tight joint between the adjacent concrete sections.

Having thus described my invention, what I claim as new and desire to secure by Letters Patent, is:

1. In a coupling for reinforced pipes, reinforcing rods having hooked ends spaced apart in alinement, a U-shaped coupling member engaging a hook on one rod, hooks disposed parallel on said coupling member straddling the hook on the end of the other rod, and a pin passing through said last-mentioned hooks.

2. In a means for connecting the reinforcements of adjacent pipe sections, the adjacent ends of said reinforcements having hooked ends spaced apart, a coupling means between said ends, said means comprising a U-shaped member having a crotch engaging one of said hooked ends and having bent-over members adapted to straddle the hooked end of an adjacent reinforcement, and a pin inserted between said bent-over members and the straddle end, whereby the reinforcements in the two pipes are locked together.

In testimony whereof I have signed my name to this specification in the presence of two subscribing witnesses.

CHARLES HARRISON WILSON

Witnesses:
D. T. PIERSON,
E. L. ARTHUR.